United States Patent

[11] 3,564,188

| [72] | Inventor | Robert P. Dathe<br>Lafayette, Calif. |
|---|---|---|
| [21] | Appl. No. | 822,582 |
| [22] | Filed | May 7, 1969 |
| [45] | Patented | Feb. 16, 1971 |
| [73] | Assignee | Hexcel Corporation<br>Dublin, Calif. |

[54] ELECTRIC DISCHARGE METHOD OF CUTTING SUSPENDED METAL WORK PIECES
8 Claims, 2 Drawing Figs.

[52] U.S. Cl. ................................................. 219/69,
83/104, 83/109, 143/19
[51] Int. Cl. .................................................. B23p 1/08;
B23d 23/02
[50] Field of Search ........................................ 219/69 (E),
69 (F), 69 (M), 69 (V), 68, 70; 143/19; 83/104,
109, 113, 149, 157, 165, 171, 201, 920

[56] References Cited
UNITED STATES PATENTS

| 2,209,412 | 7/1940 | Lupo | 83/157X |
| 2,794,110 | 5/1957 | Griffith | 219/69(V) |
| 2,974,216 | 3/1961 | Inoue | 219/69(V) |

*Primary Examiner*—R. F. Staubly
*Attorney*—Townsend and Townsend

ABSTRACT: A method for cutting workpieces with electric discharges between the workpiece and a cutting wire being passed therethrough. The workpiece is suspended from above so that severed portions of the workpiece are gravitationally biased away from the suspended portion of the workpiece.

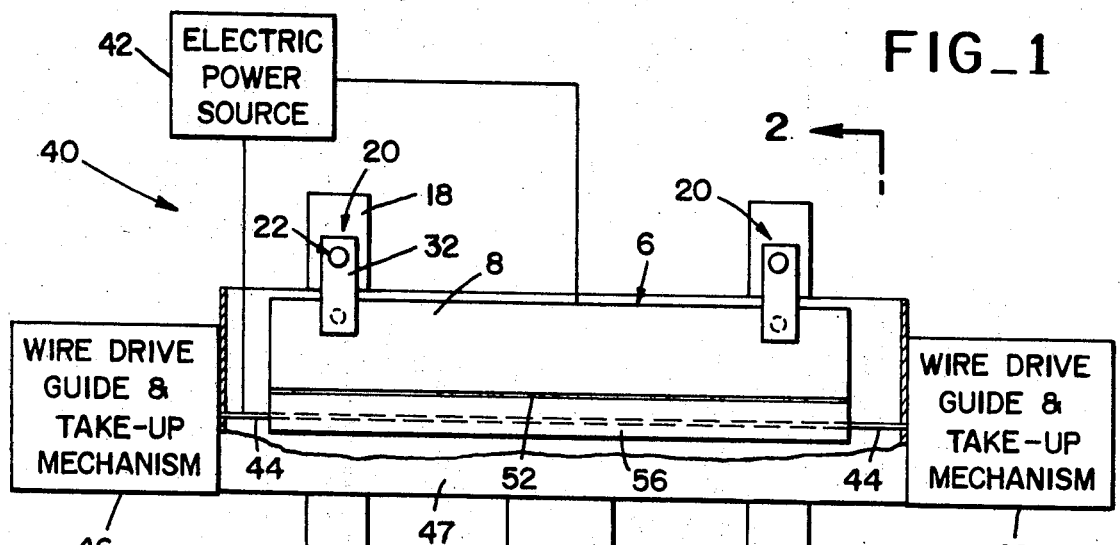
FIG_1
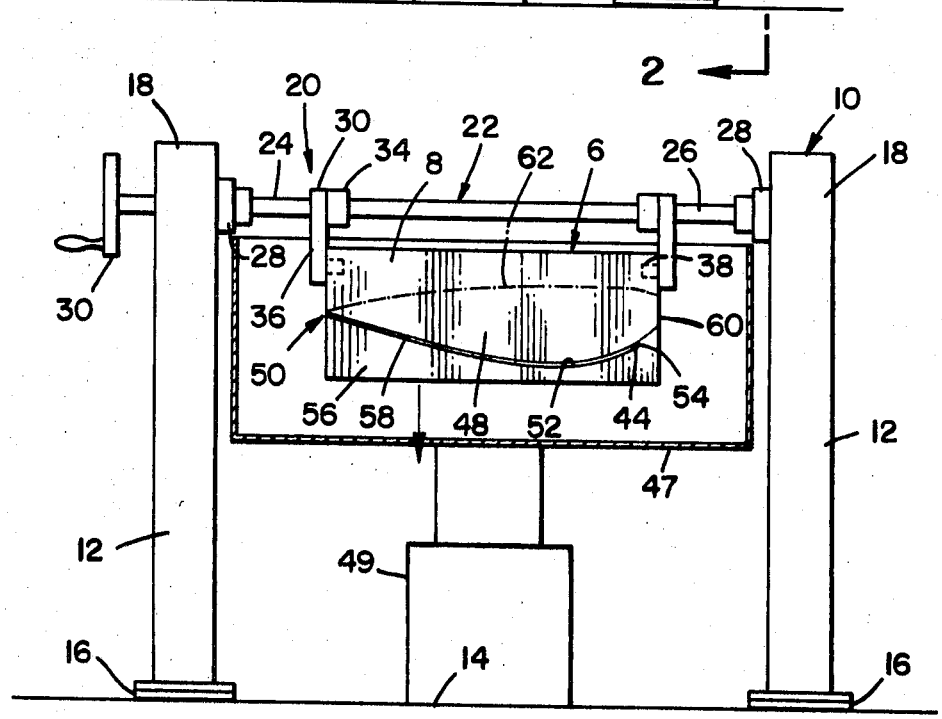
FIG_2
INVENTOR.
ROBERT P. DATHE
BY
Townsend and Townsend
ATTORNEYS

3,564,188

ELECTRIC DISCHARGE METHOD OF CUTTING SUSPENDED METAL WORK PIECES

BACKGROUND OF THE INVENTION

This invention relates to electric discharge methods of cutting workpieces and more particularly to such a method in which the article is suspended from above.

The electrical discharge method, hereinafter referred to as EDM, finds ever increasing applications in all fields of technology. A more recently developed application for EDM is the cutting of relatively large, contoured articles from workpieces. U.S. Pat. Nos. 2,794,110 and 2,974,216 are representative of these efforts. In those patents EDM is particularly employed for cutting metal honeycomb.

Prior art metal-working machines in general and the EDM machines disclosed in the above-referenced U.S. Pats. in particular support the workpiece on a horizontal table or carriage. Although such workpiece support is satisfactory for many metal-working operations, such as milling, shaping, etc., problems are encountered when employed in EDM metal-cutting machines of the type disclosed in the above-referred to U.S. Pats. since the EDM process merely slits the workpiece. Gravitational forces then bias the severed portions of the workpiece towards each other which increases the likelihood of physical contacts between the EDM wire and the workpiece. This causes electric shorts, requires a back off of the wire before the operation can continue, and therefore, is an undesirable interruption of the cutting process. Moreover, the cross section of the slit might be sufficiently reduced to prevent a back off and removal of the wire from the slit. Consequently, it has been a frequent practice to drive wedges into the slit after it has been cut to maintain it in its spread position. This is time consuming and wasteful.

A further shortcoming of the prior art support for workpieces is that as a direct result of the above mentioned reduction in the slit width from the weight of the severed portions of the workpiece only one or two cuts are made. Thereafter, the workpiece is repositioned so that the heavier portion of the workpiece is directly supported by the table or carriage. Such a repositioning of the workpiece is time consuming, particularly since the repositioning must be accurate with respect to the already cut or machined surfaces. Honeycomb material is not very rigid, particularly large size cores having relatively thin thicknesses, so that during manipulation of the honeycomb it has a tendency to change its dimensionality through a change of the expanded cell dimension. Thus, to rejig a partially machined block is difficult. In addition, such rejigging may cause uneven or rough surfaces which must subsequently be refinished.

SUMMARY OF THE INVENTION

The present invention provides a method with which metallic articles, particularly honeycomb articles, are cut from workpieces with the EDM metal-cutting process. Briefly, the method of the present invention comprises the steps of suspending the workpiece, guiding an EDM wire through the workpiece along the exterior surfaces of the article and subjecting the wire and the workpiece to an electric discharge spark producing potential. The workpiece is so suspended that all portions of the workpeice severed from the grasped portion of the workpiece fall gravitationally away from the grasped portion.

The method of the present invention prevents the heretofore troublesome closing of the slit in the workpiece from the weight of the severed workpiece portions. The weight of the severed portions biases these portions away from each other so that the width of the slit is increased. Accidental, process-stopping contact between the wire and the workpiece is thereby substantially reduced or eliminated and back-off removal of the wire through the slit is easily possible without the need for driving wedges into the slits to maintain them open.

The present method permits the continuous cutting of all articles, even if it requires a reversal of the direction in which the wire is guided through the workpiece. Since the weight of the cut article tends to open the cut slit the wire cannot become wedged in the slit and electric shorts between the workpiece and the wire from a reduction of the slit width are not encountered. The heretofore time consuming, troublesome, and wasteful rejigging of the workpiece to fully cut an article is no longer necessary.

BRIEF DESCRIPTION OF THE DRAWINGS

The objects, features and advantages of the present invention will be more apparent after referring to the following specification and accompanying drawings in which:

FIG. 1 is a schematic, front elevational view, with part broken away, of an EDM machine constructed according to the present invention to suspend the workpiece from above; and FIG. 2 is a side elevational view taken on line 2–2 of FIG. 1.

DESCRIPTION OF THE PREFERRED EMBODIMENTS

Referring to the drawings, a workpiece such as a honeycomb block 6 is grasped at a vertically upper portion 8 of the block and is suspended from a support structure 10. The support structure comprises upright columns 12 which are suitably anchored to ground 14 and which are insulated therefrom by insulators 16. Upper ends 18 of the columns mount a workpiece holding device 20. In the illustrated embodiment the holding device comprises a transverse spindle 22 having left- and right-handed threaded portions 24, 26, respectively, and which is rotatably suspended in a horizontal position in journal bearings 28. Means such as a handwheel 30 and a suitable gear train (not shown) are mounted on one of the columns 12 for rotating spindle 22 in one or the other direction.

Each spindle is provided with a pair of jaws 32 which include threaded sleeves 34 in engagement with the threaded portions 24, 26 of spindle 22. Thus, rotation of the spindle with handwheel 30 in one or the other direction moves the jaws towards or away from each other. The jaws further include downwardly depending arms or members 36 which, adjacent their lower end, include detents 38 facing towards honeycomb block 6.

The honeycomb block is secured to support structure 10 by elevating it above ground or table surface 14 so that its upper portion is disposed between arms 36 and detents 38. The handwheels on the column pairs are then rotated to move jaws 32 towards each other until they firmly grasp the honeycomb block. At that point detents 38 bite into the block and positively secure the block to the support structure.

It will be obvious to those skilled in the art that the holding device 20 illustrated in the drawings is merely exemplary of such devices. Other holding devices such as chucks, suspension beams engaging grooves or holes extending through the workpiece or the like can be employed with equal success. Moreover, the actuation of the holding device can be automated by providing motors, hydraulic or pneumatic fluid actuators or other well-known devices.

An electric discharge machining (EDM) system, generally identified by reference numeral 40 and which, per se, is not a part of the present invention, is constructed in a well-known manner and includes an electric power source 42, such as an R-F generator, electrically coupled to workpiece 6 and an EDM wire 44. The detailed construction of the EDM system is well known and is, therefore, not further described herein. For general background knowledge, in the art of employing spooled EDM wires for machining honeycomb structures reference is made to the disclosures of U.S. Pat. Nos. 2,794,110 and 2,974,216.

A drive guide and takeup mechanism 46 is disposed on each side of workpiece 6, engages EDM wire 44 and maintains the wire taut in a straight line. Thus, the wire extends over the length of the workpiece.

Each guide and takeup mechanism 46 includes a spool (not separately shown) provided with a drive to permit the simultaneous payout of wire from one spool and takeup of wire on the other spool. This permits an advance of the wire in its longitudinal direction during its use as more fully described hereinafter. The guide and takeup mechanisms further include guide members such as bushings (not separately shown) through which the EDM wire extends and which are mounted to a feed device for advancing the bushings, and therewith the EDM wire, perpendicularly to the longitudinal extent of the wire between the bushings and the guide and takeup mechanisms. Such feeds are commercially available and usually comprise a hydraulic drive to assure a smooth, vibrationless feed of the wire.

The hydraulic drive or wire feed is constructed to permit movement of the wire transversely to its longitudinal extent along straight or contoured lines and/or to permit a change of the feed direction including a reversal thereof. Thus, the drive mechanism may provide for commencement of the feed motion from left to right, as viewed in FIG. 2, and a subsequent reversal of that movement through an arc of more than 180° so that the beginning and end positions of the wire are on the same side of the workpiece or coincide as shown.

A schematically shown track 47 is provided to enable the immersion of the workpiece 6 in a dielectric liquid while the EDM wire is energized to cut through the workpiece. The track may be supported on a hydraulic lift 49 or the like to enable it to be lowered and raised. The detailed construction of the track is old and it is therefore not further illustrated herein.

To cut an article such as an air foil core 48 from workpiece 6 the latter is suspended from the support structure 10 by holding device 20 as described above. The wire drive and guide mechanism is adjusted so that the guide bushings of the mechanism move along the prescribed air foil contour and wire 44 is positioned at an entrance point 50 adjacent the periphery of the workpiece. Point 50 is chosen so that the cross section of the air foil core as defined by the wire guide bushings falls within the cross section of workpiece 6 and further so that it is vertically below upper portion 8 of the workpiece and arms 36 of jaws 32. Electric power source 42 of the EDM system 40 is energized and the EDM wire is advanced towards the workpiece. When the wire is in the vicinity of the workpiece, but just prior to physically contacting it, electric dischargers or sparks occur between the workpiece and the wire. The discharges erode metal from the workpiece and the continued advance of the wire towards and into the workpiece, as illustrated in FIG. 2 cuts a slit 52 therein. The slit has a width greater than the diameter of the EDM wire and the latter is spaced from the innermost end 54 of the slit whereby physical contacts between the wire and the workpiece and resulting electrical shorts are prevented while the electrical discharges are maintained.

As the wire advances further and further into the workpiece away from starting point 50 a scrap portion 56 of the workpiece is gravitationally biased away from the remainder of the workpiece so that the slit width tends to increase instead of decrease as encountered in the past. Thus, an undesirable narrowing of the slot width, which may cause contact between the wire and the workpiece and electrical shorts, is prevented.

The feed of the wire is maintained even if cut surfaces 58 of the air foil core changes direction and requires a change in the directionality of the feed for the wire of more than 90°. Such a surface is, for example, the leading edge of the air foil core and is identified with reference numeral 60. The feed directionality may be further changed and reversed as, for example, to cut surface 62 of air foil core 48 between the leading edge and the trailing edge of the core adjacent starting point 50. During the cutting operation scrap portion 56 and air foil core 48 are constantly biased away from grasped upper portion 8 and, when severed, drop gravitationally away from the grasped portion. Falling or deflecting workpiece portions are thus prevented from interferring with the cutting operation which can, therefore, be continuous to permit the cutting of the air foil core, or of the article, in a single pass.

The cut article has the highest degree of accuracy which is, for example, sufficient to enable the use of the present invention for cutting air foil cores which require a high degree of dimensional stability. To prevent a reduction in the wire diameter from introducing dimensional tolerances in the cut part it is preferred to continuously advance the wire in a longitudinal direction by moving the wire between the above-noted wire spools.

While one embodiment of the invention has been shown and described, it will be obvious that other adaptations and modifications can be made without departing from the true spirit and scope of the invention. For example, the particular construction of the support structure can be changed over that illustrated and described in this specification. Moreover, computer means such as numerically controlled, perforated tape can be employed to control the operation of the wire drive, guide and takeup mechanism 46.

We claim:

1. An electric spark discharge metal-cutting apparatus comprising a frame, workpiece-mounting means connected to the frame for holding a workpiece in vertically spaced elevated position above any ground support surface, electric spark discharge means including an elongate wire, and guide means guiding the wire through the workpiece to remove metal from the workpiece and cut an article, the guide means being arranged so that gravitational forces bias severed portions downwardly and away from the workpiece and to form a nonclosing gap for the wire whereby physical contact between the workpiece and the wire from a narrowing of a slit cut in the workpiece is prevented.

2. Apparatus according to claim 1 wherein the workpiece holding means includes means for engaging the workpiece at a point spaced vertically above points at which the wire enters and leaves the workpiece at the beginning and the end, respectively, of the cutting operation.

3. A method for cutting metallic articles from a workpiece by means of electric spark discharges between the workpiece and a cutting wire, the method comprising the steps of suspending the workpiece so that at least a portion thereof can gravitationally drop from a remaining portion thereof when severed therefrom, subjecting the wire and the workpiece to electric current pulses of a magnitude and frequency sufficient to induce large numbers of sparks between the wire and the workpiece to thereby erode metal from the workpiece and cut the article from the workpiece, and guiding the wire through the workpiece so that a portion of the workpiece severed from a suspended portion of the workpiece is gravitationally biased away from the suspended portion, whereby electric shorts from contact between the wire and the workpiece from the narrowing of a slit cut in the workpiece are prevented.

4. A method according to claim 3 wherein the step of guiding the wire through the workpiece includes the step of substantially reversing the direction of movement of the wire while the workpiece remains suspended, whereby articles requiring the cutting of a plurality of angularly disposed surfaces can be cut in a single pass without repositioning of the workpiece.

5. A method for cutting contiguous surfaces of an article extending over an arc of more than 90°, the method comprising the steps of suspending a workpiece from a support structure at points above entrance and exit points of a cutting wire, guiding the wire along a path defining the surfaces of the article to be cut through the workpiece, and subjecting the workpiece and the wire to pulsating electric current of a sufficient magnitude and frequency to cause large number of metal-eroding electric discharges between the wire and the workpiece to thereby cut the article from the workpiece.

6. A method of cutting from a single honeycomb workpiece a part having upper and lower machined surfaces comprising the steps of suspending the workpiece from its upper extremities in elevated position above any ground support structure, making a first pass with an elevated discharge wire cutter through said workpiece through the lower extremities of said workpiece to form the lower machined surface of the part to be formed while permitting the lowermost severed portions of the workpiece to gravitationally bias downwardly and away from the still suspended portion of the workpiece, then making a second pass with said cutter through said workpiece along a path spaced vertically above said first pass to form the upper machined surface of the part to be formed and while permitting the severed part to gravitationally bias downwardly and drop from the upper suspended portions of the workpiece.

7. A method according to claim 6 wherein the step of suspending the workpiece comprises the step of grasping a vertically spaced upper portion of the part so that entrance and exit points of the wire cutter into the honeycomb workpiece are spaced vertically downward of the grasped honeycomb portion.

8. A method according to claim 7 wherein the part comprises an air core and wherein the steps of making the first and second passes comprise the steps of entering the wire into the honeycomb workpiece at a point vertically below the grasped portion of honeycomb and guiding the wire along the air foil core contour in a continuous pass so that the air foil core is cut in a single pass of the wire through the honeycomb workpiece.